(12) United States Patent
Zupanc et al.

(10) Patent No.: US 7,926,284 B2
(45) Date of Patent: Apr. 19, 2011

(54) QUENCH JET ARRANGEMENT FOR ANNULAR RICH-QUENCH-LEAN GAS TURBINE COMBUSTORS

(75) Inventors: Frank J. Zupanc, Phoenix, AZ (US); Jurgen C. Schumacher, Phoenix, AZ (US); Rodolphe Dudebout, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 968 days.

(21) Appl. No.: 11/606,567

(22) Filed: Nov. 30, 2006

(65) Prior Publication Data

US 2008/0127651 A1   Jun. 5, 2008

(51) Int. Cl.
*F02C 1/00* (2006.01)
(52) U.S. Cl. ............................................. 60/754; 60/752
(58) Field of Classification Search .................. 60/39.23, 60/752–760
See application file for complete search history.

(56) References Cited

U.S. PATENT DOCUMENTS

| | | | | |
|---|---|---|---|---|
| 3,990,837 | A | * | 11/1976 | Snell ................................ 60/752 |
| 4,893,475 | A | | 1/1990 | Willis |
| 4,996,838 | A | * | 3/1991 | Melconian ....................... 60/804 |
| 5,241,827 | A | * | 9/1993 | Lampes ............................ 60/754 |
| 5,279,127 | A | * | 1/1994 | Napoli ............................. 60/754 |
| 5,934,067 | A | | 8/1999 | Ansart et al. |
| 6,070,412 | A | | 6/2000 | Ansart et al. |
| 6,101,814 | A | | 8/2000 | Hoke et al. |
| 6,145,319 | A | * | 11/2000 | Burns et al. ...................... 60/755 |
| 6,240,731 | B1 | | 6/2001 | Hoke et al. |
| 6,260,359 | B1 | | 7/2001 | Monty et al. |
| 6,378,286 | B2 | | 4/2002 | Vermes et al. |
| 6,408,629 | B1 | * | 6/2002 | Harris et al. ..................... 60/804 |
| 6,474,070 | B1 | | 11/2002 | Danis et al. |
| 6,543,233 | B2 | | 4/2003 | Young et al. |
| 6,546,731 | B2 | | 4/2003 | Alkabie et al. |
| 6,606,861 | B2 | | 8/2003 | Snyder |
| 6,675,587 | B2 | * | 1/2004 | Graves et al. .................... 60/804 |
| 6,810,673 | B2 | | 11/2004 | Snyder |
| 6,826,913 | B2 | | 12/2004 | Wright |
| 7,000,400 | B2 | | 2/2006 | Schumacher et al. |
| 2005/0247065 | A1 | | 11/2005 | Dudebout et al. |

FOREIGN PATENT DOCUMENTS

EP   1235032 A2   8/2002

OTHER PUBLICATIONS

PCT Search Report dated May 4, 2009, PCT/US2007/085618.

* cited by examiner

*Primary Examiner* — Michael Cuff
*Assistant Examiner* — Gerald L Sung
(74) *Attorney, Agent, or Firm* — Ingrassia Fisher & Lorenz, P.C.

(57) ABSTRACT

A combustor includes an outer liner having a first row and a second row of circumferentially distributed air admission holes penetrating therethrough. The combustor further includes an inner liner circumscribed by the outer liner and having a first row and a second row of circumferentially distributed air admission holes penetrating therethrough. The combustor further includes a plurality of fuel injectors extending into the combustion chamber and configured to deliver an air-fuel mixture to the combustion chamber. Each of the plurality of fuel injectors are associated with two air admission holes in the first row of the outer liner, two air admission holes in the first row of the inner liner, four air admission holes in the second row of the outer liner, and two air admission holes of the second row of the inner liner.

18 Claims, 3 Drawing Sheets

QUENCH JET ARRANGEMENT FOR ANNULAR RICH-QUENCH-LEAN GAS TURBINE COMBUSTORS

FIELD OF THE INVENTION

The present invention generally relates to gas turbine engine combustors, and more particularly, to a quench jet arrangement for reducing NOx emissions from annular rich burn, quick-quench, lean burn (RQL) gas turbine engine combustors.

BACKGROUND OF THE INVENTION

Gas turbine engines, such as those used to power modern commercial aircraft, include a compressor for pressurizing a supply of air, a combustor for burning a hydrocarbon fuel in the presence of the pressurized air, and a turbine for extracting energy from the resultant combustion gases. The combustor typically comprises radially spaced apart inner and outer liners. The inner and outer liners define an annular combustion chamber between the compressor and the turbine. A plurality of circumferentially distributed fuel injectors project into the forward end of the combustion chamber to supply the fuel to the combustion chamber. Rows of circumferentially distributed air admission holes penetrate each liner to admit air into the combustion chamber.

There is an increasing desire to reduce gaseous pollutant emissions that form in the combustion process of gas turbine engines, particularly oxides of nitrogen (NOx). One approach to reduce NOx emissions is the implementation of a rich burn, quick quench, lean burn (RQL) combustion concept. A combustor configured for RQL combustion includes three serially arranged combustion zones: a rich burn zone at the forward end of the combustor, a quench or dilution zone downstream of the rich burn zone, and a lean burn zone downstream of the quench zone. By precisely controlling the zone stoichiometries between the air and fuel, high-temperature excursions can be reduced and the resulting NOx emissions can be minimized. The effectiveness of the RQL concept, however, is primarily dependent on the design of the quick quench section of the combustor when the fuel-rich gases from the rich burn zone are rapidly mixed with excess air and passed to the lean burn zone. The design and development of the quench zone geometry is one of the challenges in the successful implementation of low-emissions RQL combustors.

Accordingly, it is desirable to provide a combustor with improved NOx emissions. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A combustor for a turbine engine is provided. The combustor includes an outer liner having a first row and a second row of circumferentially distributed air admission holes penetrating therethrough, the second row of the outer liner being downstream of the first row of the outer liner, and the air admission holes of the first row of the outer liner being larger than the air admission holes of the second row of the outer liner. The combustor further includes an inner liner circumscribed by the outer liner and having a first row and a second row of circumferentially distributed air admission holes penetrating therethrough, the second row of the inner liner being downstream of the first row of the inner liner, the air admission holes of the first row of the inner liner being larger than the air admission holes of the second row of the inner liner, and the inner and outer liners forming a combustion chamber. The combustor further includes a plurality of fuel injectors extending into the combustion chamber and configured to deliver an air-fuel mixture to the combustion chamber, each of the plurality of fuel injectors being associated with two air admission holes in the first row of the outer liner, two air admission holes in the first row of the inner liner, four air admission holes in the second row of the outer liner, and two air admission holes of the second row of the inner liner. The first row of air admission holes in the inner liner is generally aligned with the first row of air admission holes in the outer liner in a longitudinal direction, the second row of air admission holes in the inner liner is generally aligned with the second row of air admission holes in the outer liner in the longitudinal direction, and the first row of air admission holes in the inner liner is circumferentially offset with respect to the first row of air admission holes in the outer liner.

A method is provided for manufacturing a combustor for a turbine engine. The method includes providing an outer liner having a first row and a second row of circumferentially distributed air admission holes penetrating therethrough, the second row of the outer liner being downstream of the first row of the outer liner, and the air admission holes of the first row of the outer liner being larger than the air admission holes of the second row of the outer liner. The method further includes providing an inner liner circumscribed by the outer liner and having a first row and a second row of circumferentially distributed air admission holes penetrating therethrough, the second row of the inner liner being downstream of the first row of the inner liner, the air admission holes of the first row of the inner liner being larger than the air admission holes of the second row of the inner liner, and the inner and outer liners forming a combustion chamber. The method also includes providing a plurality of fuel injectors extending into the combustion chamber and configured to deliver an air-fuel mixture to the combustion chamber, each of the plurality of fuel injectors being associated with two air admission holes in the first row of the outer liner, two air admission holes in the first row of the inner liner, four air admission holes in the second row of the outer liner, and two air admission holes of the second row of the inner liner. The first row of air admission holes in the inner liner is generally aligned with the first row of air admission holes in the outer liner in a longitudinal direction, the second row of air admission holes in the inner liner is generally aligned with the second row of air admission holes in the outer liner in the longitudinal direction, and the first row of air admission holes in the inner liner is circumferentially offset with respect to the first row of air admission holes in the outer liner.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
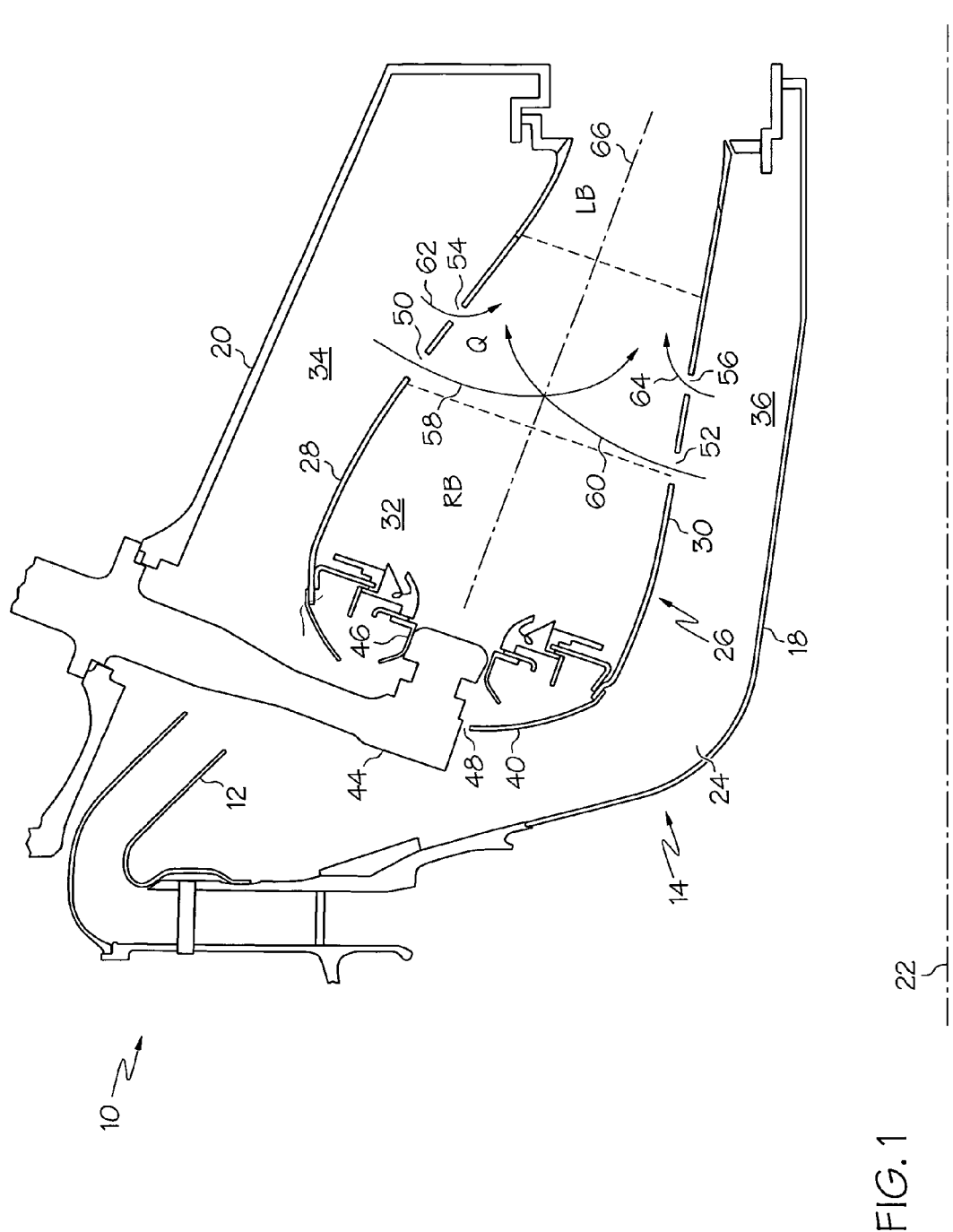
FIG. 1 is a partial, cross-sectional side elevation view of a combustor in a gasa turbine engine according to one embodiment of the present invention.

Referring to FIG. 1, the components of a gas turbine engine 10 include a compressor (not shown), a diffuser 12, a combustor module 14, and a turbine module (not shown). The combustor module 14 comprises a radially inner case 18 and a radially outer case 20 concentrically arranged with respect to the inner case 18. The inner and outer cases 18, 20 circumscribe an axially extending engine centerline 22 to define an annular pressure vessel 24. The combustor module 14 also includes a combustor 26 residing within the annular pressure vessel 24. The combustor 26 is defined by an outer liner 28 and an inner liner 30 that is circumscribed by the outer liner 28 to define an annular combustion chamber 32. The liners 28, 30 cooperate with cases 18, 20 to define respective outer and inner air plenums 34, 36.

The combustor 26 includes a front end assembly 38 comprising an annularly extending shroud 40, a dome assembly 42, fuel injectors 44, and fuel injector guides 46. One fuel injector 44 and one fuel injector guide 46 are shown in the partial cross-sectional view of FIG. 1. In one embodiment, the combustor 26 includes a total of sixteen circumferentially distributed fuel injectors 44, but it will be appreciated that the combustor 26 could be implemented with more or less than this number of injectors 44.

The shroud 40 extends between and is secured to the forwardmost ends of the outer and inner liners 28, 30. The shroud 40 includes a plurality of circumferentially distributed shroud ports 48 that accommodate the fuel injectors 44 and introduce air into the forward end of the combustion chamber 32.

Each fuel injector 44 is secured to the outer case 20 and projects through one of the shroud ports 48. Each fuel injector 44 introduces a swirling, intimately blended fuel-air mixture that supports combustion in the combustion chamber 32.

Figure 2:
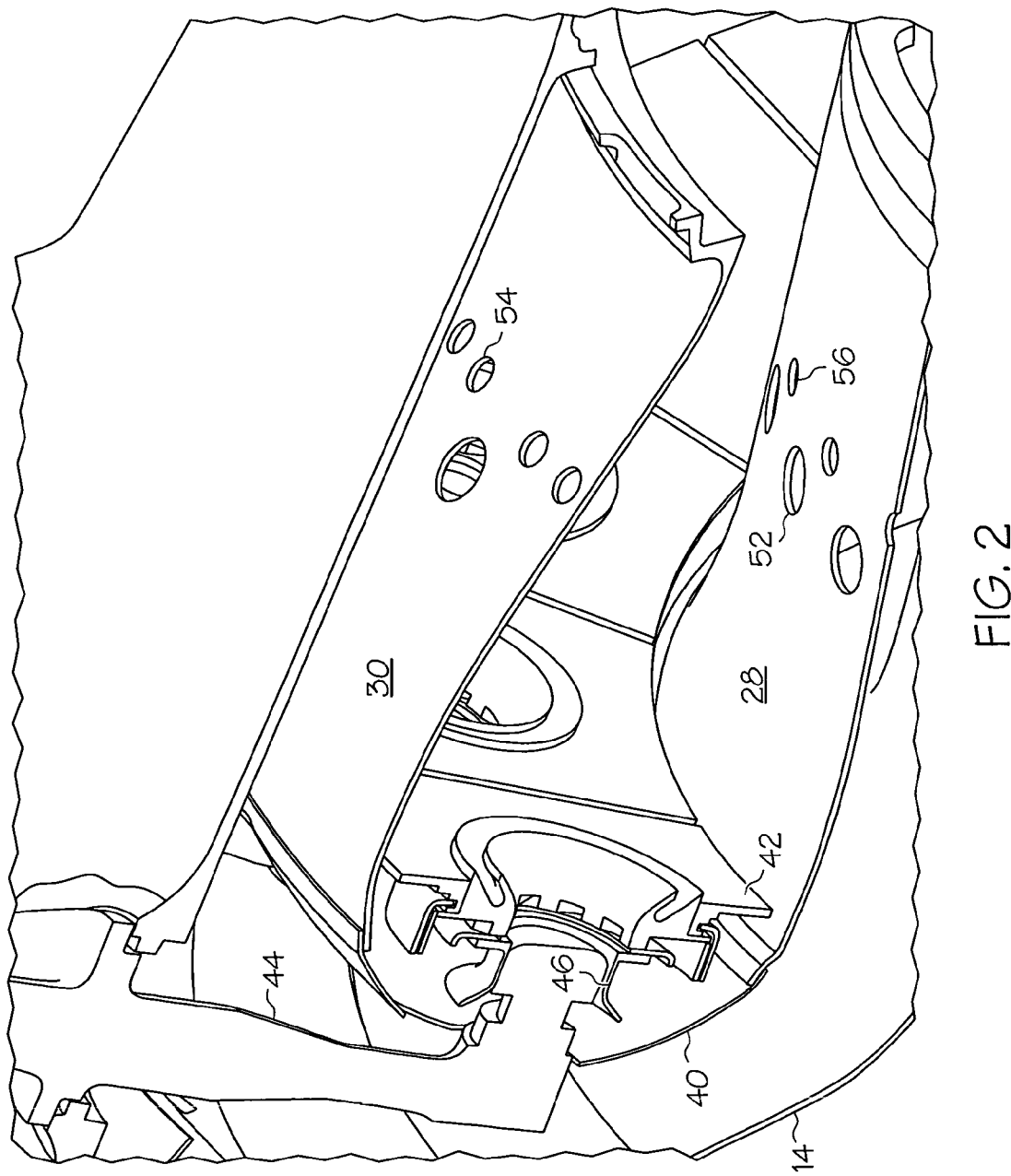
FIG. 2 is a partial, perspective view of the combustor of FIG. 1.
Figure 3:
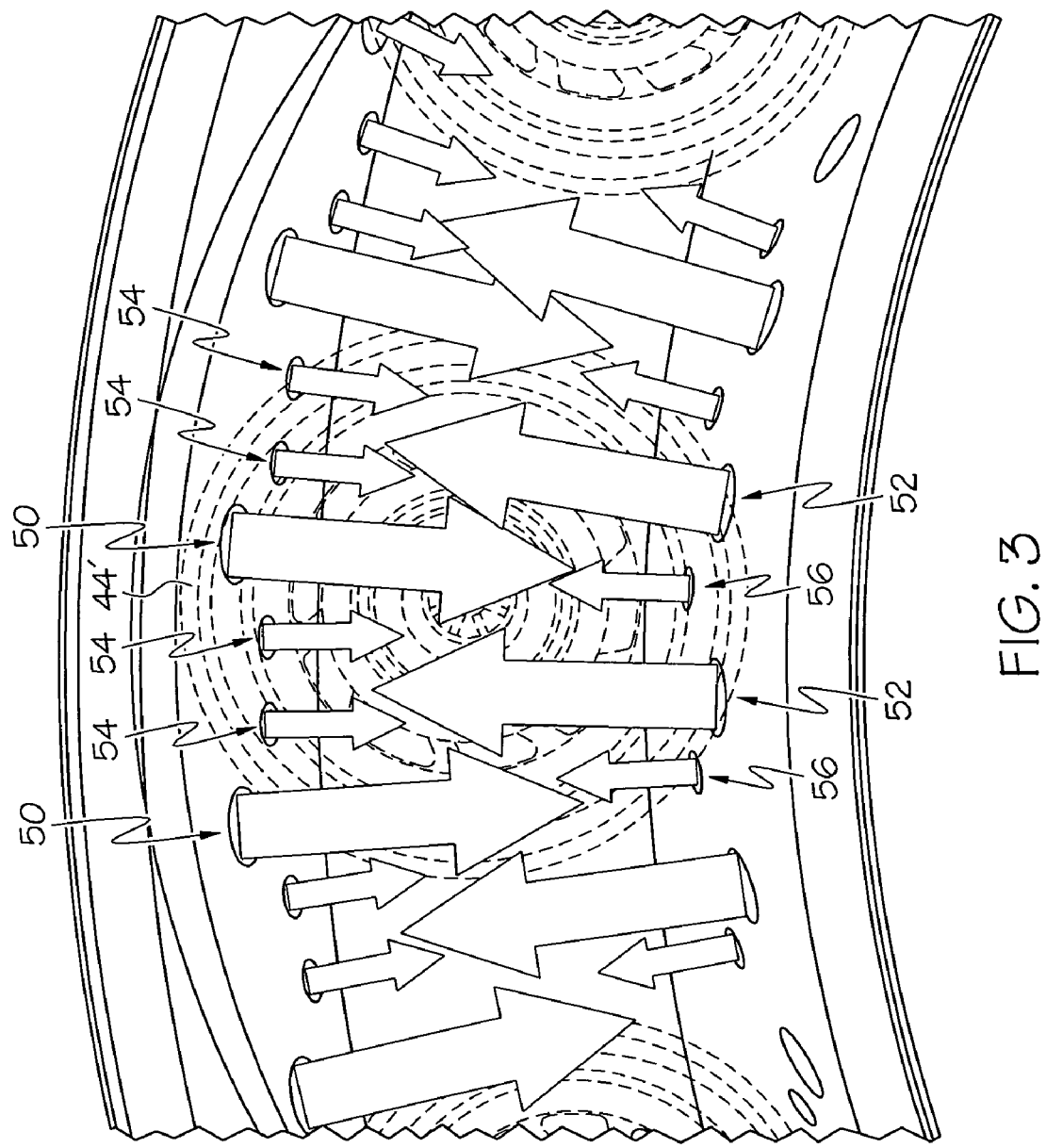
FIG. 3 is a partial, axial cross-sectional view of the combustor of FIG. 1.

FIG. 2 illustrates a partial perspective view of one embodiment of the combustor 26 taken from the top, rear and side perspective with a cross sectional portion of the combustor 26 removed for clarity. FIG. 3 illustrates a partial axial cross-sectional view of one embodiment of the combustor 26. For reference, the approximate circumferential position of the fuel injector 44 is designated in FIG. 3 as reference number 44'.

Referring to FIGS. 1-3, the outer liner 28 includes a first row 50 of air admission holes, and the inner liner 30 includes a first row 52 of air admission holes. The first rows 50, 52 in the outer and inner liners 28, 30 are generally aligned with one another along the longitudinal axis of the combustor 26, as best shown by FIG. 1. However, as best shown by FIG. 3, the air admission holes in the first row 50 of the outer liner 28 are circumferentially offset with respect to the air admission holes in the first row of the inner liner 30. As best shown in FIG. 3, each fuel injector 44 is associated with two air admission holes in the first row 50 of the outer liner 28 and two air admission holes in the first row 52 of the inner liner 30.

The outer liner 28 further includes a second row 54 of air admission holes, and the inner liner 30 includes a second row 56 of air admission holes. The first rows 50, 52 are distinct rows relative to the second rows 54, 56. In one embodiment, the trailing edges of the air admission holes of each of the first rows 50, 52 are separated from the leading edges of the air admission holes of each of the respective second rows 54, 56 by about 0.5 inches. The second row 54 of air admission holes in the outer liner 28 and the second row 56 of air admission holes in the inner liner 30 are generally aligned with one another along the longitudinal axis of the combustor 26, as best shown in FIG. 1. However, as best shown in FIG. 3, the second row 54 of air admission holes in the outer liner 28 is circumferentially offset with respect to the second row 56 of air admission holes in the inner liner 30. As best shown in FIG. 3, each fuel injector 44 is associated with four air admission holes in the second row 54 of the outer liner 28 and two air admission holes in the second row 98 of the inner liner 32.

In one embodiment, the air admission holes in the first row of 50 the outer liner 28 are circumferentially aligned with the second row 56 of the inner liner 30. The air admission holes of the first row 52 of the inner liner 30 can be generally circumferentially aligned with the air admission holes of the second row 54 of the outer liner 28; however, since there are four air admission holes in the second row 54 of the outer liner 28 for every two air admission holes in the first row 52 of the inner liner 30, two of the air admission holes in the second row 54 of the outer liner 28 are circumferentially centered around one of the air admission holes of the first row 52 of the inner liner 30 and the other two air admission holes of the second row 54 of the outer liner 28 are circumferentially centered around the other one of the air admission holes of the first row 52 of the inner liner 30.

Thus, for each fuel injector 44, there are two air admission holes in the first row 50 of the outer liner 28, two air admission holes in the first row 52 of the inner liner 30, four air admission holes in the second row 54 of the outer liner 28, and two air admission holes in the second row 56 of the inner liner 30. Since the air admission holes of the first rows 50, 52 are circumferentially offset with respect to one another and the air admission holes of the second rows 54, 56 are circumferentially offset with respect to one another, this configuration is designated a "staggered 2-2-4-2" configuration. In an embodiment with sixteen fuel injectors 44, there are a total of thirty-two air admission holes in the first row 50 of the outer liner 28, thirty-two air admission holes in the first row 52 of the inner liner 30, sixty-four air admission holes in the second row 54 of the outer liner 28, and thirty-two air admission holes in the second row 56 of the inner liner 30.

The air admission holes of both the first and second rows 50, 52, 54, 56 in both the outer and inner liners 28, 30 are generally circular, although other shapes can be provided. The air admission holes in the first rows 50, 52 are relatively large, and the air admission holes in the second rows 54, 56 are relatively small. An exemplary diameter of the air admission holes in the first row 50, 52 is about 0.4 inches, and exemplary diameter of air admission holes in the second row 54, 56 is about 0.25 inches, although the diameters can vary. In some embodiments, the ratio of the diameters of the air admission holes of the first and second rows 50, 52, 54, 56 are maintained when scaling the inner and outer liners 28, 30 for larger engines 10. In one embodiment, the diameters of the air admission holes in the first row 52 of the inner liner 30 are equal to the diameters of the air admission holes in the first row 50 of the outer liner 28, and the diameters of the air admission holes in the second row 56 of the inner liner 30 are equal to the diameters of the air admission holes in the second row 54 of the outer liner 28.

In operation, the diffuser 12 decelerates pressurized air flowing from the compressor (not shown). A portion of the pressurized air enters a rich burn zone RB of the combustion chamber 32 by way of passages in the front end assembly 38. This air is referred to as primary combustion air because it intermixes with a stoichiometrically excessive quantity of fuel introduced through the fuel injectors 44 to support initial combustion in the rich burn zone RB. The rich stoichiometry of the fuel-air mixture in the rich burn zone produces a relatively cool flame, thus preventing excessive NOx formation and guarding against blowout of the combustion flame during any abrupt reduction in engine power.

The combustion products from the rich burn zone RB, which include unburned fuel, then enter a quench zone Q. Major jets 58, 60 flow from the plenums 34, 36 and into the quench zone Q through the first rows 50, 52 of air admission holes in the outer and inner liners 28, 30. Downstream of the major jets 58, 60, minor jets 62, 64 flow from the plenums 34, 36 and into the quench zone Q through the second rows 54, 56 of air admission holes in the outer and inner liners 28, 30. The major and minor jets 58, 60, 62, 64 are referred to as dilution air because its purpose is to dilute or derich the combustion products from their stoichiometrically rich state at the forward edge of the quench zone Q to a stoichiometrically lean state at or just downstream of the aft edge of the quench zone Q. The air mixes with the combustion products entering the quench zone Q to support further combustion and release additional energy from the fuel. The air also rapidly leans the fuel rich combustion products as they flow axially through the quench zone Q and mix with the air. Initially, the fuel-air ratio of the combustion products changes from fuel rich to stoichiometric, causing an attendant rise in the combustion flame temperature. Since the quantity of NOx produced in a given time interval increases exponentially with flame temperature, substantial quantities of NOx can be produced during the initial quench process. As the quenching continues, the fuel-air ratio of the combustion products changes from stoichiometric to fuel lean, causing an attendant reduction in the flame temperature. However, until the mixture is diluted to a fuel-air ratio substantially lower than stoichiometric, the flame temperature remains high enough to generate considerable quantities of NOx. It is important for the dilution air to intermix intimately with the combustion products flowing through the combustion chamber 32 so that the fuel-air mixture quickly becomes both thoroughly blended and regularly distributed.

The major jets 58, 60 enter the combustion chamber 32 through the first rows 50, 52 of air admission holes in the outer and inner liners 28, 30 and typically penetrate radially inwardly beyond the meanline 66 of the combustion chamber 32 while also being swept axially downstream into the combustion products from the rich burn zone RB. The minor jets 62, 64 enter the combustion chamber 32 through the second rows 54, 56 of air admission holes in the outer and inner liners 28, 30. The minor jets 62, 64 of air help to dilute or quench the fuel-air mixture in the sectors of the combustion chamber 32 downstream of the major jets 58, 60 to complete the quench process.

As noted above, the first row 50 of the outer liner 28 is circumferentially aligned with the second row 56 of the inner liner 30, and the first row 52 of the inner liner 30 is circumferentially aligned with the second row 54 of the outer liner 28. Generally, the rows 50, 52, 54, 56 of air admission holes are sized and configured such that the amount of penetration of the major jets 58, 60 and the minor jets 62, 64 correspond to 100% of the height of the combustion chamber 32. For example, if the major jets 58 flowing through the air admission holes in the first row 50 of the outer liner 28 penetrate about 75% of the height of the combustion chamber 26, the minor jets 64 flowing through the air admission holes of the second row 56 of the inner liner 30 penetrate about 25% of the height of the combustion chamber 26. Similarly, if the major jets 60 flowing through the air admission holes in the first row 52 of the inner liner 30 penetrate about 75% of the height of the combustion chamber 26, the minor jets 62 flowing through the air admission holes of the second row 54 of the outer liner 28 penetrate about 25% of the height of the combustion chamber 26.

Moreover, due to the offset of the first rows 50, 52, the major jets 58 flowing through the outer liner 28 cooperate with the major jets 60 flowing through the inner liner 30 to ensure that dilution air spans radially across the entire combustion chamber annulus. By staggering the first rows 50, 52, impingement of the major jets 58, 60 is minimized and very little air is recirculated back upstream into the rich burn zone RB, thereby avoiding excessive NOx formation in the rich burn zone RB.

The pressure drop of the major jets 58, 60 and the minor jets 62, 64 through the first and second rows 50, 52, 54, 56 of the inner and outer liners 28, 30 can be about 3-4%. The pressure drop is defined as the percentage pressure drop through the liners 28, 30 relative to the upstream pressure.

The penetration depth of the major and minor jets 58, 60, and the corresponding quantity of air admitted through the first and second rows 50, 52, 54, 56, may be regulated by specifying the relative sizes of the air admission holes since the penetration depth of the jets 58, 60 and the fluid admission capacity of the holes both increase with increasing hole size. As a result, the temperature profile of the combustion gases can be adjusted, for example, by adjusting the size of the air admission holes in the first and second rows 50, 52, 54, 56, without compromising fuel-air mixing, which could lead to elevated levels of NOx.

Finally, the combustion products from the quench zone Q enter a lean burn zone LB where the combustion process concludes. As the combustion products flow into the lean burn zone LB, the air jets 58, 60, 62, 64 are swept downstream and also continue to penetrate radially and spread out laterally and intermix thoroughly with the combustion gases.

The circumferential distribution and axial alignment of the air admission holes in the first and second rows 50, 52, 54, 56 not only mitigate NOx formation as described above, but also adjust the peak temperature and spatial temperature profile of the exhaust gases entering the turbine module.

Evaluations using computational fluid dynamics (CFD) techniques have shown the efficacy of the combustor 26 with the staggered 2-2-4-2 configuration of one embodiment. One embodiment of the combustor 26 with a staggered 2-2-4-2 configuration reduces NOx admissions by more than about 20%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a turbine engine, comprising:
   an outer liner having a first row and a second row of circumferentially distributed air admission holes penetrating therethrough for admitting dilution jets of air, the air admission holes of the first and second rows of the outer liner having leading and trailing edges such that the leading edges of the second row of the outer liner are downstream of the trailing edges of the first row of the outer liner, and the air admission holes of the first row of the outer liner being larger than the air admission holes of the second row of the outer liner;

an inner liner circumscribed by the outer liner and having a first row and a second row of circumferentially distributed air admission holes penetrating therethrough for admitting dilution jets of air, the air admission holes of the first and second rows of the inner liner having leading and trailing edges such that the leading edges of the second row of the inner liner are downstream of the trailing edges of the first row of the inner liner, the air admission holes of the first row of the inner liner being larger than the air admission holes of the second row of the inner liner, and the inner and outer liners forming a combustion chamber; and a plurality of fuel injectors extending into the combustion chamber and configured to deliver an air-fuel mixture to the combustion chamber, wherein the outer liner is defined by a series of outer liner regions separated by boundaries, each extending in a straight line, axially in a downstream direction, and positioned midway between adjacent fuel injectors, wherein each of the outer liner regions defines two air admission holes of the first row of the outer liner and four air admission holes of the second row of the outer liner, wherein the inner liner is defined by a series of inner liner regions separated by boundaries, each extending in a straight line, axially in a downstream direction, and positioned midway between adjacent fuel injectors, wherein each of the inner liner regions defines two air admission holes of the first row of the inner liner and two air admission holes of the second row of the inner liner, wherein the first row of air admission holes in the inner liner is generally aligned with the first row of air admission holes in the outer liner in a longitudinal direction, the second row of air admission holes in the inner liner is generally aligned with the second row of air admission holes in the outer liner in the longitudinal direction, and the first row of air admission holes in the inner liner is circumferentially offset with respect to the first row of air admission holes in the outer liner, and wherein each two of immediately adjacent air admission holes of the second row of the outer liner are circumferentially centered around a respective one of the air admission holes of the first row of the inner liner.

2. The combustor of claim 1, wherein the second row of air admission holes in the inner liner is circumferentially offset with respect to the second row of air admission holes in the outer liner.

3. The combustor of claim 1, wherein the combustion chamber defines a rich burn zone, a quench zone, and a lean burn zone, the first and second rows of air holes in the inner and outer liners introducing air jets into quench zone.

4. The combustor of claim 1, wherein the first row of air admission holes in the outer liner is generally circumferentially aligned with the second row of air admission holes in the inner liner.

5. The combustor of claim 1, wherein the air admission holes of the first rows of the inner and outer liners each have a diameter of about 0.4 inches.

6. The combustor of claim 1, wherein the air admission holes of the second rows of the inner and outer liners each have a diameter of about 0.25 inches.

7. The combustor of claim 1, wherein the air admission holes of the first rows of the inner and outer liners each have a first diameter, the air admission holes of the second rows of the inner and outer liners each have a second diameter, and the ratio of the first diameter to the second diameter is about 1.6 to 1.

8. The combustor of claim 1, wherein the second row of the inner liner is downstream of the first row of the outer liner by about 0.5 inches.

9. The combustor of claim 1, wherein the second row of the outer liner is downstream of the first row of the outer liner by about 0.5 inches.

10. A method for manufacturing a combustor for a turbine engine, comprising:

providing an outer liner having a first row and a second row of circumferentially distributed air admission holes penetrating therethrough for admitting dilution jets of air, the air admission holes of the first and second rows of the outer liner having leading and trailing edges such that the leading edges of the second row of the outer liner are downstream of the trailing edges of the first row of the outer liner, and the air admission holes of the first row of the outer liner being larger than the air admission holes of the second row of the outer liner;

providing an inner liner circumscribed by the outer liner and having a first row and a second row of circumferentially distributed air admission holes penetrating therethrough for admitting dilution jets of air, the air admission holes of the first and second rows of the inner liner having leading and trailing edges such that the leading edges of the second row of the inner liner are downstream of the trailing edges of the first row of the inner liner, the air admission holes of the first row of the inner liner being larger than the air admission holes of the second row of the inner liner, and the inner and outer liners forming a combustion chamber; and providing a plurality of fuel injectors extending into the combustion chamber and configured to deliver an air-fuel mixture to the combustion chamber, wherein the outer liner is defined by a series of outer liner regions separated by boundaries, each extending in a straight line, axially in a downstream direction, and positioned midway between adjacent fuel injectors, wherein each of the outer liner regions defines two air admission holes of the first row of the outer liner and four air admission holes of the second row of the outer liner, wherein the inner liner is defined by a series of inner liner regions separated by boundaries, each extending in a straight line, axially in a downstream direction, and positioned midway between adjacent fuel injectors, wherein each of the inner liner regions defines two air admission holes of the first row of the inner liner and two air admission holes of the second row of the inner liner, wherein the first row of air admission holes in the inner liner is generally aligned with the first row of air admission holes in the outer liner in a longitudinal direction, the second row of air admission holes in the inner liner is generally aligned with the second row of air admission holes in the outer liner in the longitudinal direction, and the first row of air admission holes in the inner liner is circumferentially offset with respect to the first row of air admission holes in the outer liner, and wherein each two of immediately adjacent air admission holes of the second row of the outer liner are circumferentially centered around a respective one of the air admission holes of the first row of the inner liner.

11. The method of claim 10, wherein the second row of air admission holes in the inner liner is circumferentially offset with respect to the second row of air admission holes in the outer liner.

12. The method of claim 10, wherein the combustion chamber defines a rich burn zone, a quench zone, and a lean burn zone, the first and second rows of air holes in the inner and outer liners introducing air jets into quench zone.

13. The method of claim 10, wherein the first row of air admission holes in the outer liner is generally circumferentially aligned with the second row of air admission holes in the inner liner.

14. The method of claim 10, wherein the air admission holes of the first rows of the inner and outer liners each have a diameter of about 0.4 inches.

15. The method of claim 10, wherein the air admission holes of the second rows of the inner and outer liners each have a diameter of about 0.25 inches.

16. The method of claim 10, wherein the air admission holes of the first rows of the inner and outer liners each have a first diameter, the air admission holes of the second rows of the inner and outer liners each have a second diameter, and the ratio of the first diameter to the second diameter is about 1.6 to 1.

17. The method of claim 10, wherein the second row of the inner liner is downstream of the first row of the outer liner by about 0.5 inches.

18. The method of claim 10, wherein the second row of the outer liner is downstream of the first row of the outer liner by about 0.5 inches.

* * * * *